United States Patent
Adachi

(10) Patent No.: US 9,776,167 B2
(45) Date of Patent: Oct. 3, 2017

(54) AGGREGATED TREATMENT AGENT

(71) Applicant: Kanichi Adachi, Tokyo (JP)

(72) Inventor: Kanichi Adachi, Tokyo (JP)

(*) Notice: Subject to any disclaimer, the term of this patent is extended or adjusted under 35 U.S.C. 154(b) by 0 days.

(21) Appl. No.: 14/708,676

(22) Filed: May 11, 2015

(65) Prior Publication Data

US 2016/0332139 A1 Nov. 17, 2016

(51) Int. Cl.
| | |
|---|---|
| *B01J 20/26* | (2006.01) |
| *B01J 20/16* | (2006.01) |
| *B01J 20/04* | (2006.01) |
| *B01J 20/06* | (2006.01) |
| *B01J 20/28* | (2006.01) |
| *A47K 11/03* | (2006.01) |

(52) U.S. Cl.
CPC ............ *B01J 20/261* (2013.01); *A47K 11/03* (2013.01); *B01J 20/043* (2013.01); *B01J 20/048* (2013.01); *B01J 20/06* (2013.01); *B01J 20/16* (2013.01); *B01J 20/28004* (2013.01)

(58) Field of Classification Search
CPC ....................................................... B01J 20/26
USPC ............................................................ 502/402
See application file for complete search history.

(56) References Cited

U.S. PATENT DOCUMENTS

2013/0130895 A1* 5/2013 Herfert .................. B01J 20/08
502/402

FOREIGN PATENT DOCUMENTS

| JP | 2004-329113 A | 11/2004 |
|---|---|---|
| JP | 2008-095016 | 4/2008 |
| JP | 2014-087779 | 5/2014 |
| WO | WO 2011162244 A1 | 12/2011 |

OTHER PUBLICATIONS

English translation of JP-A-2014-087779, dated May 15, 2014.
Japanese Office Action dated Feb. 7, 2017 which issued in the corresponding Patent Application No. 2013-088683, including English translation.

* cited by examiner

*Primary Examiner* — Edward Johnson
(74) *Attorney, Agent, or Firm* — Dickinson Wright PLLC

(57) ABSTRACT

An object of the invention is to provide a treatment agent for treating excrement and the like. The treatment agent is an aggregated treatment agent comprising slaked lime, a water absorptive polymer, a binder, and at least one member selected from the group consisting of a phosphoric acid salt, a carbonic acid salt and a hydroxide at pH 8 to 13.

14 Claims, No Drawings

AGGREGATED TREATMENT AGENT

TECHNICAL FIELD

The present invention relates to a treatment agent. More specifically, the present invention relates to a treatment agent used for treatment of excrement and the like.

BACKGROUND ART

Generally, a toilet can be divided broadly into a flush type in which excrement is flushed down a drain with water, and a vault type in which excrement is stored in a tank. In the case of a flush toilet, excrement is flushed down a drain with water, and treated at a sewage-treatment plant. On the other hand, in the case of a vault toilet, excrement is drawn up from a tank by a vacuum car and the like, and carried to a sewage-treatment plant and treated.

In the sewage-treatment plant, sewage including excrement is stored in a septic tank, wherein organic matters in the excrement is decomposed and removed by effects of microorganisms such as activated sludge, and subsequently water is purified through several steps of treatment processes and discharged into river.

However, at the time of long time power failure and water failure by disaster such as earthquake, a toilet cannot be used, and excrement is pooled in large quantities in homes. From large quantities of excrement pooled, malodor is exhaled continuously, and living environment is considerably deteriorated by bad odor if excrement is left as they are. Accordingly, generally employed is a method in which excrement is put into a bag made of plastic, and stored in the sealing state for the time being. However, the method has a problem such that the bag made of plastic is easily damaged; it is damaged during the storing, excrement is leaked out, and malodor is exhaled to the surroundings. In addition, the method also has a problem such that the excrement put into the bag made of plastic are decayed as time goes and odorous gas is pooled, and the gas is leaked out from the bag made of plastic due to the pressure of the gas.

In addition, a simple toilet is used at a place such as a construction site, an event site, a campsite. However, a conventional simple toilet has a problem such that an excess quantity of excrement may be pooled in the toilet, and malodor is exhaled to the surroundings.

Under such circumstances, a highly water absorptive polymer for excretion treatment is disclosed, wherein an aqueous solution of an acrylic acid monomer having 50 mol % or more of the neutralization index is subjected to a polymerization reaction, a hydrophilic polyvalent epoxy compound and a polymerization initiator are added, and then a gelatinous solid body is formed by being subjected to a re-polymerization reaction by irradiating with light; moreover, the gelatinous solid body is dried with hot wind, crushed and sorted, then crushed materials are surface-treated by adding a surface crosslinking agent (Japanese Patent Application Laid-Open No. 2008-095016).

SUMMARY OF INVENTION

The inventor recognized that when excrement is treated using a highly water absorptive polymer described above; there is a problem that the treated objects are decayed in several days after the treatment, and malodor or gas is generated. In addition, the inventor recognized that there are problems in use, which have not been recognized.

A purpose of the invention is to provide a treatment agent that can suppress generation of malodor or gas after treating an object, and also to provide a treatment agent that resolves at least one of the problems in use.

To achieve at least one of the objects described above, a treatment agent reflecting one aspect of the invention comprises the followings:

(1) An aggregated treatment agent, which comprises slaked lime, a water absorptive polymer, a binder, and at least one member being selected from the group consisting of a phosphoric acid salt, a carbonic acid salt and a hydroxide at pH 8 to 13. According to such constitutions, it is possible to treat an object (for example, feces) simply and effectively without procedures such as stirring. In addition, spoilage of a treated object after treatment hardly occurs, and generation of malodor and gas can be effectively suppressed. Namely, the aggregated treatment agent can be used as a disinfectant, a deodorant, a germicide or a sterilant and the use of it is also related to preventing an infectious disease. In addition, the treatment agent of the invention is solidified, and thus floating of dust particles in use is prevented, and as a result, handling property is improved. In particular, in case of disaster, fine dust is not generated by using the treatment agent of the invention, and thus the treatment agent is very excellent from a viewpoint of handling property, and can significantly suppress health damage. Furthermore, the treatment agent of the invention can maintain the form of semisolid state (gel state) even if a long period of time elapses after the use. In the case where a liquid treating object (for example, urine) is treated using a conventional treatment agent, a portion or the whole of the treated object is liquefied, and deodorization effect and handling property are decreased when a long period of time elapses although the conventional treatment agent can make a treating object the form of solid or semisolid state (gel state) immediately after the treatment. Such tendency is particularly noticeable in the case where the treatment agent is used under high temperature such as the summer season and an area having high air temperature. Moreover, the conventional treatment agent having poor handling property easily adheres to the skin and the like. In such case, this type of treatment agent may likely cause a disease such as dermatitis when a life at the shelter is continued for a long period of time and immunity strength is lowered. However, the treatment agent of the invention is solidified, and the treated object treated by the treatment agent can maintain solid or semisolid state (gel state) for a long period of time even if a liquid treating object is treated, and thus handling property of the treated object considerably improves in comparison with the conventional treatment agent. As a result thereof, it is possible to provide a treatment agent that is sanitarily excellent.

(2) The aggregated treatment agent as described in (1), wherein the phosphoric acid salt is selected from the group consisting of disodium hydrogen-phosphate, trisodium phosphate, dipotassium hydrogen-phosphate and tripotassium phosphate. According to such constitutions, the effects described above are further improved. Specifically, the treated object is hardly liquefied, and handling property is further improved even if a long period of time elapses after the treating object is treated.

(3) The aggregated treatment agent as described in (1) or (2), wherein the aggregated treatment agent further comprises at least one of zeolite and zinc oxide. According to such constitutions, the effects described above are further improved. Specifically, at least one of zeolite and zinc oxide can adsorb smell components such as ammonia and sulfide that can be generated from a treated object (for example, feces and urine). Accordingly, malodor can be further suppressed.

(4) The aggregated treatment agent as described in any one of (1) to (3), which is used for treatment of excrement. The excrement treatment agent of the invention is suitable for treatment of excrement as it has the effects described above.

(5) The aggregated treatment agent as described in any one of (1) to (4), wherein the average diameter of the aggregated treatment agent is 3 to 100 mm. According to such constitutions, it is possible to improve handling property, and increase the contact area with a treating object, and improve the efficiency of the reaction with the treating object.

(6) A granulated treatment agent, which is obtained by crushing the aggregated treatment agent as described in any one of (1) to (5). According to such constitutions, procedures such as stirring are not necessary, and it is possible to treat urine and the like simply and effectively, and suppress generation of malodor and gas. In addition, with the granulated treatment agent, it is possible to increase the ratio of active components per unit weight from a viewpoint that it is not necessary to maintain a massive aggregated shape such as the aggregated treatment agent for a longtime when manufacturing the granulated treatment agent and it is possible to reduce the amount of the binder.

(7) The granulated treatment agent as described in (6), wherein the average particle diameter of the granulated treatment agent is more than 150 μm and less than 3 mm. According to such constitutions, it is possible to improve handling property, increase the contact area with a treating object, and improve the efficiency of the reaction with the treating object.

(8) A toilet in which the aggregated treatment agent as described in any one of (1) to (5), or the granulated treatment agent as described in (6) or (7) is arranged in advance. According to such constitutions, procedures such as stirring are not necessary, and it is possible to treat urine and the like simply and effectively, and suppress generation of malodor and gas. In addition, in the toilet of the invention, the treatment agent is previously arranged, and thus it is not necessary for a user oneself (or those dependent on care and the like) to check the excrement after excretion, and the user can comfortably use the toilet. In contrast, with a conventional treatment agent, it was necessary for a user oneself (or a care giver and the like) to sprinkle the conventional treatment agent onto the excrement after excretion, which may be unpleasant to the user (or a care giver and the like). However, according to the toilet of the invention, the treatment agent is previously arranged, and thus the toilet of the invention also has an effect that it would be sufficient to discard a simple toilet as needed without checking a treated object after excretion. Furthermore, even if a long period of time elapses after a liquid matter such as urine is treated, a treated object can maintain the solid or semisolid state (gel state) and it is hardly liquefied, and thus the toilet of the invention also has an effect that when a treated object is transferred to a discard location from the toilet, the transferring work can be easily performed.

(9) The toilet as described in (8), in which the aggregated treatment agent as described in any one of (1) to (5), or the granulated treatment agent as described in (6) or (7) is arranged in advance in the absence of water. According to such constitutions, preserving property as a toilet also improves.

(10) An absorption article for excrement, which is formed by comprising the aggregated treatment agent as described in anyone of (1) to (5), or the granulated treatment agent as described in (6) or (7). According to such constitutions, procedures such as stirring are not necessary, and it is possible to treat urine and the like simply and effectively, and suppress generation of malodor and gas. In addition, at least one of the aggregated treatment agent and the granulated treatment agent of the invention comprised in the absorption article has very excellent deodorization property, and further suppresses liquefaction of an treated object even if long time elapses after a liquid matter such as urine is treated, which makes it possible to greatly reduce burden of a person oneself with the absorption article or a care giver.

DESCRIPTION OF EMBODIMENTS

Hereinafter, the invention will be described. Meanwhile, the invention is not limited to the embodiments below. In the specification, "X to Y" representing a range means "X or more and Y or less", and "weight" and "mass", "weight %" and "mass %", and "weight parts" and "mass parts" are regarded as synonyms. In addition, unless otherwise noted, "%" is interpreted as "weight %" or "mass %". Unless otherwise noted, procedures and measurements of physical properties and the like, are measured at conditions of room temperature (20 to 25° C.) and relative humidity (40 to 50%).

<First Aspect of the Invention>

(1) Aggregated Treatment Agent

The first aspect of the invention is an aggregated treatment agent, which comprises slaked lime, a water absorptive polymer, a binder, and at least one member being selected from the group consisting of a phosphoric acid salt, a carbonic acid salt and a hydroxide at pH 8 to 13. As described above, the treatment agent of the invention is solidified by containing the binder, and thus has excellent handling property. The components constituting the aggregated treatment agent of the invention are present in the state of being bound to each other by the binder. In addition, the meaning of the "aggregated treatment agent" in the specification is a concept comprising not only those solidified by tableting, but also those aggregated that is unstable by flocculation of the components with each other. In addition, in the case where the aggregated treatment agent of the invention is contacted with a liquid treating object (for example, urine), the aggregated treatment agent becomes swollen to be the solid or semisolid state (gel state). Then, by a treated object being solid or semisolid state (gel state), it is possible for the components of the treatment agent to effectively coat a treating object when it is charged into the treatment agent. It is considered that when a treating object is charged into the treatment agent, the treating object gets into the aggregated treatment agent by the pressure of the charge and the weight of the treating object, and becomes a form of being covered by the components of the treatment agent. By such form, it is possible to suppress release of bad odor generated from the treated object into the air. Furthermore, in the case where the treating object is feces, the components of the treatment agent can cover the outside of the feces, which can prevent spoilage and suppress bad odor. Then, with treatment of the aggregated treatment agent of the invention, the treated object can hold the form of the solid or semisolid state (gel state) for a long period of time, by which the excellent effect of suppressing diffusion of bad odor can be maintained for a long period of time.

The shape of the aggregated treatment agent of the invention is not particularly limited if it is solidified, and comprises slaked lime, a water absorptive polymer, a binder, and at least one member being selected from the group consisting of a phosphoric acid salt, a carbonic acid salt and a hydroxide at pH 8 to 13 as the components of the aggregated treatment agent. Examples of shape of the aggregated treatment agent include a globular shape, a columnar shape, a medium-tall columnar shape, a rectangular shape and the like. The shape of the aggregated treatment agent is preferably a globular shape, a columnar shape, a medium-tall columnar shape and the like from a viewpoint of storage stability of the treatment agent, and it is preferably a columnar shape, or a medium-tall columnar shape from a viewpoint of manufacture.

The average diameter of the aggregated treatment agent is preferably 3 to 100 mm. By such range, it is possible to significantly resolve problems caused by dust particles described above, to improve handling property, to increase the contact area with a treating object, and to improve the efficiency of reaction with a treating object, and the effects described above can be easily achieved. The average diameter of the aggregated treatment agent is more preferably 6 to 50 mm, and further preferably 7 to 20 mm. The average diameter of the aggregated treatment agent is an average value, and the value can be obtained by randomly selecting 50 particles of the aggregated treatment agent; measuring the longest particle diameter per particle; and taking arithmetic average of 50 particles.

The average thickness of the aggregated treatment agent is preferably 1 to 30 mm, more preferably 2 to 15 mm, and further preferably 4 to 10 mm. By such range, the effects described above can be easily exhibited.

It is particularly preferable that the average diameter is 7 to 20 mm and the average thickness is 4 to 10 mm from a viewpoint that the decay speed of the aggregated treatment agent can be increased when the aggregated treatment agent is contacted with the treating object, and also the aggregated treatment agent is easily manufactured.

If the aggregated treatment agent has the form of a columnar shape, a medium-tall columnar shape or a rectangular shape, the longer axis becomes the average diameter. On the other hand, the shorter axis becomes the average thickness. Herein, the "average diameter" and the "average thickness" are with respect to a tabletted aggregated treatment agent.

The weight of the aggregated treatment agent is not particularly limited, but the weight per one particle is preferably about 0.05 to 30 g, more preferably about 0.2 to 10 g, and further preferably about 0.3 to 2 g from a viewpoint of transportability and handling property. The weight of the aggregated treatment agent may be beyond this range.

Hereinafter, the constitution elements will be described in detail.

[Slaked Lime]

Slaked lime ($Ca(OH)_2$) contained in the aggregated treatment agent is strongly alkaline, and thus has great sterilization effect on treating excrement (particularly feces). In addition, the slaked lime has effects of sterilizing, pasteurizing, disinfecting and deodorizing, for example, animals or farm animals suffering from foot-and-mouth disease, avian influenza and the like or dead bodies thereof, feed (plant and the like) taken by the animals or farm animals, livestock barns being or having been occupied by the animals or farm animals, or soil and road around the livestock barns. Fermentation and decomposition of organic matters can be stopped by these effects. Then, an effect of reducing bad odor can be obtained. In addition, the slaked lime mainly adsorbs sulfide, and thus it can be said that using the slaked lime has a great effect of reducing bad odor.

The shape of slaked lime is not particularly limited, and examples thereof include a granulated shape, a pellet-like shape and the like. The shape of slaked lime is preferably a granulated shape from a viewpoint of effectively dispersing slaked lime with respect to feces. The lower limit of the average particle diameter is not particularly limited. For example, it is 10 μm or more, and preferably 50 μm or more. The upper limit of the average particle diameter is not particularly limited. For example, it is 1000 μm or less, preferably 500 μm or less, more preferably 300 μm or less, and further preferably 150 μm or less. Namely, the average particle diameter is preferably 10 to 1000 μm, more preferably 50 to 300 μm and further preferably 100 to 150 μm.

By such range, manufacture of the aggregated treatment agent becomes easy, the production cost becomes low, the contact area of the obtained treatment agent with the treating object is increased, the reaction efficiency is improved, and aggregated matters of the aggregated treatment agent do not remain at the time of treatment, namely unreacted matters do not remain. Two or more kinds of slaked lime having different average particle diameters may be used in combination as necessary. The value of such average particle diameter according to the invention is an average value, and it can be obtained by randomly selecting 100 particles; measuring the longest particle diameter per one particle with a microscope; and taking arithmetical average of them. Hereinafter, the "average particle diameter" described in the specification is similarly defined. To obtain the desired average particle diameter, a sieve and the like may be suitably used.

The slaked lime used in the invention may be surface-treated with a hydrophobic coating agent. In addition, the slaked lime used in the invention may be synthesized or may be a commercial product.

The content of such slaked lime in the case where the slaked lime is contained in the aggregated treatment agent is about 5 to 90 weight %, preferably about 8 to 70 weight % and more preferably about 10 to 50 weight % with respect to the total mass of the aggregated treatment agent (100 weight %; the same shall apply hereinafter). By such range, the effect of reducing bad odor and suppressing generation of gas at the time of treating an object (for example, excrement) can be successfully obtained.

[Water Absorptive Polymer (which May be Also Referred to as Water Absorptive Agent or Polymer Water Absorptive Agent)]

A water absorptive polymer (water absorptive agent) contained in the aggregated treatment agent plays a role of helping slaked lime. Namely, for example, in the case where slaked lime only is used as the component of the treatment agent, slaked lime may sometimes not absorb the moisture of an treating object (for example, excrement), and a treated object becomes muddy or liquid. If slaked lime is to be wet, slaked lime itself may release malodor. In addition, if a treating object is muddy, excrement contained in a treating object may be contacted with the air, and fermentation and decomposition of the excrement may likely proceed.

Since a water absorptive polymer (polymer water absorptive agent) is contained in the aggregated treatment agent, the water absorptive polymer can absorb the moisture in a treating object, and a treated object can be solidified. If the slaked lime and the water absorptive polymer are added to a treating object, it can be solidified, and the circumference of the solidified treated object may be covered with the slaked lime, which makes it possible to stop fermentation and decomposition activity of the treated object by microorganisms, and eventually the effects described above can be obtained. In addition, the above-mentioned effects can also be obtained by reducing the addition amount of slaked lime in comparison to the case where the water absorptive polymer is not contained, and thus it is possible to further reduce malodor from the slaked lime itself. Furthermore, the water absorptive polymer plays a role as a base point for decay of the solidified aggregated treatment agent because the water absorptive polymer is swollen when contacted with moisture. As a result thereof, the components of the aggregated treatment agent can quickly coat a treating object, and further diffusion of malodor can be suppressed.

The water absorptive polymer used in the invention is not particularly limited unless it brings a bad influence to accomplishing the effects of the invention, and a known substance may be used. Specific examples thereof include starch-based water absorptive polymers such as a starch-acrylonitrile graft polymer hydrolysate and a starch-acrylic acid graft polymer; cellulose-based water absorptive polymers such as a cellulose-acrylonitrile graft polymer and a cellulose-styrene sulfonic acid graft copolymer; protein-based water absorptive polymers such as a polysaccharide-based water absorptive polymer and collagen; polyvinyl alcohol-based water absorptive polymers such as a polyvinyl alcohol cross-linked polymer; acryl-based water absorptive polymers such as a sodium polyacrylate cross-linked product, a cross-linked product of an acrylic acid polymer partial sodium salt and a sodium acrylate-vinyl alcohol copolymer; polyether-based water absorptive polymers such as a maleic anhydride-based water absorptive polymer, a vinyl pyrrolidone-based water absorptive polymer, polyethylene glycol-diacrylate cross-linked polymer; and the like. These water absorptive polymers may be used alone or may be used in combination of 2 or more members.

The water absorptive polymer may be synthesized or a commercial product may be used. Examples of the commercial product include water absorptive polymers such as AQUA KEEP (registered trademark) SA (manufactured by Sumitomo Seika Chemicals Company Limited), AQUALIC (registered trademark) CA (manufactured by NIPPON SHOKUBAI CO., LTD.), Sun Fresh and Aqua Pearl (manufactured by San-Dia Polymers, Ltd.), and Haimosabu HS-960 (manufactured by HYMO Co., Ltd.). Among these water absorptive polymers, Haimosabu HS-960 (manufactured by HYMO Co., Ltd.) is further preferred. Among AQUA KEEP (registered trademark) SA (manufactured by Sumitomo Seika Chemicals Company Limited), SA-50II, SA-60N TYPE-II or SA60-S is preferred, and from a viewpoint of the water absorbing power, SA60-S is preferred. In addition, SA-50II or SA-60N TYPE-II is preferred from a viewpoint of cost.

The shape of the water absorptive polymer is not particularly limited, and examples thereof include a particle shape, a powder shape, a granulated shape, a pellet-like shape and the like. In the case where the water absorptive polymer has a particle shape, the average particle diameter is not particularly limited. It is preferably 50 to 1000 µm, more preferably 80 to 850 µm, and further preferably 100 to 600 µm.

The content of the water absorptive polymer can be suitably adjusted by the member or the shape of the water absorptive polymer, and the moisture amount contained in a treating object, and the like, and it is about 1 to 90 weight %, preferably about 4 to 60 weight %, more preferably about 5 to 50 weight %, and further preferably about 10 to 45 weight % with respect to the total mass of the aggregated treatment agent. By such range, the effects of the water absorptive polymer are obtained significantly, and unreacted water absorptive polymer may not remain, which allows advantage in the cost.

[Binder]

The binder contained in the aggregated treatment agent may be an organic binder, or an inorganic binder. However, from a viewpoint of binding property, the binder is preferably at least one member of an organic binder selected from the group consisting of a cellulose-based binder, a polymer-based binder and a starch-based binder; and a cellulose-based binder is particularly preferable.

The aggregated treatment agent is characterized that components such as the slaked lime and the water absorptive polymer are solidified. The aggregated treatment agent contains the water absorptive polymer. The water absorptive polymer (water absorptive agent) acts as a cushion when solidification (compression), and tableting or compression may become difficult.

However, the aggregated treatment agent contains the binder as one of the components, and thus solidification, tableting and granulation of the constitution components become easy. Then, according to the binder contained, the aggregated treatment agent has sufficient strength. It is preferred from a viewpoint of transportability and handling property.

The binder contained in the aggregated treatment agent may be synthesized by a conventionally known method, or may be prepared by purchasing a commercial product. Suitably used commercial products are Serossa K2, PH-102, TG-101, ST-02 and TG-101 manufactured by Asahi Kasei Chemicals Corporation, PVPK-15, PVPK-30 and PVPK-90 (polyvinyl pyrrolidone) manufactured by HIGUCHI INC., KC Flock (W-50S, W-50, W-100/100G, W-200/200G, W-250, W-300G and W-400G) manufactured by NIPPON PAPER Chemicals CO., LTD. and the like. Serossa K2 manufactured by Asahi Kasei Chemicals Corporation and cellulose-based KC Flock manufactured by NIPPON PAPER Chemicals CO., LTD. are preferred from a viewpoint of bonding strength and decay property since they have a fiber-like shape. In addition, the inventor found that KC Flock manufactured by NIPPON PAPER Chemicals CO., LTD. and Serossa K2 manufactured by Asahi Kasei Chemicals Corporation are very excellent from a viewpoint of binding property. In particular, the inventor found that Serossa K2 manufactured by Asahi Kasei Chemicals Corporation is significantly excellent from a viewpoint of high bonding strength and smooth feed from a hopper of a tableting machine because the shape is a fiber-like shape and the particles are fine.

The average particle diameter of the binder contained in the aggregated treatment agent is not particularly limited. It is preferably 1 µm to 100 µm, more preferably 5 µm to 70 µm, and further preferably 20 µm to 60 µm.

The content of the binder is about 0.3 to 85 weight %, preferably about 1 to 80 weight %, more preferably about 5 to 70 weight %, further preferably about 8 to 65 weight %, and particularly preferably about 20 to 60 weight % with respect to the total mass of the aggregated treatment agent. Such ranges are preferred from a viewpoint of the effects of aggregating the slaked lime and the water absorptive polymer of a powdery form, and preventing scattering of dust particles in use. When a cellulose-based binder is used as the binder, for example, there are the effects below as the amount of the binder increases. The binder itself has water absorption property, and exhibits a function of helping the water absorptive agent acting as the base point for decay, and when the aggregated treatment agent is contacted with a treating object, the decay speed of the aggregated treatment agent increases. In addition, when the amount of the binder decreases, the cost can be suppressed to be lower, and as the volume of the binder contained in the aggregated treatment agent decreases, the contact area of other constitution components with a treating object may increase, which improves reactivity.

In addition, a carboxyvinyl polymer may be used as the binder.

The carboxyvinyl polymer is an acrylic acid-based crosslinked copolymer, and is a cross-linked polymer of acrylic acid-based monomers of substituted acrylic acids such as acrylic acid, methacrylic acid and ethacrylic acid. The acrylic acid-based monomer is preferably acrylic acid, methacrylic acid or ethacrylic acid; and acrylic acid is most preferable.

The crosslinking agent in the carboxyvinyl polymer is preferably a polyalkenyl ether of polyvalent alcohol having 2 or more carbon-carbon double bonds per 1 molecule (alkenyl ether group), and examples thereof specifically include allyl ether of sucrose, allyl ether of pentaerythritol and the like.

The carboxyvinyl polymer may be freely selected from commercial products. A carboxyvinyl polymer having a slight time-dependent change of viscosity and high stability is preferably used.

Examples of commercial product of the carboxyvinyl polymer may include AQUPEC (registered trademark) HV-501 [viscosity: 5400-11400 mPa·s (0.5%)], HV-504 [viscosity: 26500-39500 mPa·s (the same)], HV-505 [viscosity: 45000-70000 mPa·s (the same)], HV-501E [viscosity: 5400-11400 mPa·s (the same)], HV-504E [viscosity: 26500-39500 mPa·s (the same)], HV-505E [viscosity: 40000-70000 mPa·s (the same)], HV-501ER [viscosity: 7000-14000 mPa·s (the same)] and HV-505ED [viscosity: 40000-60000 mPa·s (the same)] (manufactured by Sumitomo Seika Chemicals Company Limited), Carbopol 980 [viscosity: 16000-28000 mPa·s (0.2%)], 981 [viscosity: 4000-7500 mPa·s (the same)], 2984 [viscosity: 2500-6500 mPa·s (the same)], ETD 2050 [viscosity: 6000-14000 mPa·s (the same)] and Ultrez 10 [viscosity: 12000-29000 mPa·s (the same)] (manufactured by The Lubrizol Corporation), Junron PW-110 [viscosity: 10000-20000 mPa·s (0.2% neutralization, 25° C.)], PW-111 [viscosity: 3000-7000 mPa·s (the same)], PW-150 [viscosity: 15000-25000 mPa·s (the same)], PW-302S [viscosity: 15000-25000 mPa·s (the same)], PW-350S [viscosity: 1500-50000 mPa·s (the same)] and PW-500 [viscosity: 20000-35000 mPa·s (the same)] (manufactured by TOAGOSEI CO., LTD.), HIVISWAKO (registered trademark) 103 [viscosity: 15000 mPa·s (0.2% neutralization)], 104 [viscosity: 26000 mPa·s (the same)] and 105 [viscosity: 4000 mPa·s (the same)] (manufactured by Wako Pure Chemical Industries, Ltd.), Carbopol (registered trademark) 71G [viscosity: 4000-11000 mPa·s (0.5 wt. %, pH 7.5)], 971P [viscosity: 4000-11000 mPa·s (the same)], 981 [viscosity: 4000-10000 mPa·s (the same)], 941 [viscosity: 4000-10000 mPa·s (the same)], 934 [viscosity: 30500-39400 mPa·s (the same)] and 934P [viscosity: 29400-39400 mPa·s (the same)] (manufactured by B.F. Goodrich Company), Unisafe ECT-203, calcium and potassium salts of a carboxyvinyl polymer (manufactured by NOF CORPORATION) and the like. Carbopol (registered trademark) series, AQUPEC (registered trademark) series, HIVISWAKO (registered trademark) series and AQUPEC (registered trademark) are preferable, and HV-505 is more preferable. The above-mentioned viscosities are a value at 25° C. The carboxyvinyl polymer may be used alone or suitably in combination of 2 or more members.

The content of the carboxyvinyl polymer is not particularly limited. it is preferably 0.001 to 10 mass %, more preferably 0.01 to 5 mass %, and further preferably 0.1 to 3 mass % with respect to the total mass of the aggregated treatment agent.

If the carboxyvinyl polymer is contained as the binder, the carboxyvinyl polymer has an effect of flocculating the slaked lime, and as a result, it can suppress dust particles, and resolve the intended problems. Moreover, just with a process of putting and mixing the carboxy polymer, the invention has an effect of preventing dust particles of the slaked lime, and a processing process (tableting process) may be omitted in manufacture of the aggregated treatment agent, and effects of increase in the production performance and decrease in the cost can be obtained.

[Phosphoric Acid Salt, Carbonic Acid Salt and Hydroxide]

A phosphoric acid salt, a carbonic acid salt and a hydroxide contained in the aggregated treatment agent of the invention and at pH 8 to 13 (hereinafter, they may be simply referred to as the "salt") are alkaline, and thus they have similar effects to those of slaked lime. The pH described in the specification is a value obtained by preparing an aqueous solution of a substance in 1 weight % wherein the substance is those having sufficient solubility with respect to water (those having solubility such that an aqueous solution of 1 weight % can be prepared, namely those dissolving in 1 g or more with respect to 100 g water at room temperature), and measuring this solution using PH recorder SD card record, model number PH-SD manufactured by Sato Shoji Corp. In addition, with respect to those having relatively low solubility to water (those having low solubility such that 1 weight % of an aqueous solution cannot be adjusted, namely, those dissolving in less than 1 g with respect to 100 g water at room temperature), the pH is a value obtained by measuring the pH with respect to a saturated aqueous solution thereof (which may be a slurry solution) using the above-mentioned measuring instrument.

The phosphoric acid salt, carbonic acid salt and hydroxide at pH 8 to 13 are also alkaline, and thus have similar effects to those of slaked lime. Therefore, the aggregated treatment agent containing not only slaked lime, but also the above-mentioned salts has further improved sterilizing, pasteurizing, disinfecting and deodorizing effects when treating excrement. As described above, the aggregated treatment agent containing slaked lime, the water absorptive polymer and the binder can solidify or semi-solidify (gelation) a treating object when contacted with it. However, the inventor found problems that as the alkalinity of the components of the treatment agent increases, the deodorizing effect and the like increase; however, if long time elapses particularly after the treatment agent is used with respect to a liquid object, a portion or the whole of a treated object may be liquefied, and the deodorizing effect may decrease, and handling property may decrease.

With respect to such problems, the inventor found that by adding at least one member being selected from the group consisting of a phosphoric acid salt, a carbonic acid salt and a hydroxide at pH 8 to 13, it is possible to suppress liquefaction of a treated object even when long time elapses after the treatment agent is used. Namely, the inventor found that by the treatment agent containing a salt having suitable alkalinity, it is possible for a treated object to maintain the solid or semisolid state (gel state). The water absorption property of the water absorptive polymer decreases if the ion concentration of an external aqueous solution is high. In addition, due to the presence of slaked lime, liquid is likely drained from the water absorptive polymer. However, in the aggregated treatment agent of the invention, a treated object can maintain the solid state by containing a salt having suitable alkalinity. Namely, it is considered that suitable molecule structure becomes easily fixed in a treated object, and as a result thereof, water holding property of the water absorptive polymer contained in the treatment agent may be maintained. The invention is not limited to the above-mentioned mechanism.

The pH of the above-mentioned phosphoric acid salt, carbonic acid salt and hydroxide is preferably 8.2 to 12.5, is more preferably 8.5 to 11, and particularly preferably 9 to 10 from a viewpoint that liquefaction of a treated object hardly occurs, and corrosive property is prevented when contacted with human skin. Namely, the above-mentioned salts are preferably a weak alkaline salt. Due to a weak alkaline salt, the treatment agent holds further easily the molecular chain network of the water absorptive polymer.

In addition, a counter ion of phosphoric acid, carbonic acid or hydroxide ion in the above-mentioned salts may be any one of an organic ion and an inorganic ion. However, the counter ion is preferably an inorganic ion from a viewpoint of the degree of ionization and the like. Examples of the inorganic ion include a cation of alkaline metals, a cation of Group II elements, a cation of transition metals, and the like. A cation of an alkaline metal or positive ion of a Group II element is preferable. Namely, the above-mentioned salt is preferably at least one member being selected from the group consisting of an alkaline metal or Group II element phosphoric acid salt, an alkaline metal or Group II element carbonic acid salt and an alkaline metal or Group II element hydroxide.

Furthermore, among the above-mentioned counter ions, sodium ion, potassium ion, magnesium ion and calcium ion are preferred, and sodium ion and potassium ion are particularly preferred. It is considered that with phosphoric acid salts, carbonic acid salts or hydroxides of these ions, for example when polyacrylic acid salt is used as the water absorptive polymer, affinity to the "salt portion" of polyacrylic acid salt is high, and the network of the water absorptive polymer can be strongly held. As a result thereof, it becomes easy to suppress returning the gel state of a treated object to the liquid state even if long time elapses.

The shape of the above-mentioned phosphoric acid salt, carbonic acid salt and hydroxide is not particularly limited, and examples thereof include a granulated shape, a pellet-like shape and the like. The shape is preferably a granulated shape from a viewpoint of effective dispersion with respect to feces.

The size of the above-mentioned salts is not particularly limited. The average particle diameter is preferably about 100 nm to 3 mm, and more preferably about 0.01 to 1 mm. A powdery form having the above-mentioned average particle diameter is preferred from a viewpoint that manufacture of the aggregated treatment agent becomes easy, and the salts play a supplementary role for the water absorptive polymer. There are no problems to deviate from these ranges depending on the member or in consideration of convenience of the manufacture.

The amount of the above-mentioned salts (the total mass of the plural members if the salts are in plural members) is preferably 5 to 60 weight %, more preferably 5.5 to 55 mass %, further more preferably 8 to 50 weight %, and particularly preferably 10 to 30 weight % with respect to the total mass of the aggregated treatment agent. By such range, the deodorizing effect increases, and further liquefaction of a treated object can be prevented.

In addition, the amount of the above-mentioned salts (the total mass of the plural members if the salts are in plural members) is preferably nearly equal or more than the amount of slaked lime in the weight ratio. By such weight ratio, the effect of suppressing liquefaction of a treated object can increase particularly in the case where sodium polyacrylate as the water absorptive polymer is used. On the other hand, if the amount of the above-mentioned salts is too great the amount of slaked lime, the water absorptive speed of the aggregated treatment agent decreases. Thus, the amount of the above-mentioned salts is preferably about double or less in weight ratio with respect to the amount of slaked lime.

(Phosphoric Acid Salt)

Examples of the phosphoric acid salt at pH 8 to 13 that can be used in the invention include, more specifically, disodium hydrogen-phosphate ($Na_2HPO_4$ or $Na_2HPO_4.12H_2O$; pH=9.0 to 9.6), trisodium phosphate ($Na_3PO_4$ or $Na_3PO_4.12H_2O$; pH=11.5 to 12.5), tetrasodium pyrophosphate ($Na_4P_2O_7$ or $Na_4P_2O_7.10H_2O$; pH=9.9 to 10.7), sodium tripolyphosphate ($Na_5P_3O_{10}$; pH=9.0 to 10.2), dipotassium hydrogen-phosphate ($K_2HPO_4$ or $K_2HPO_4.12H_2O$; pH=8.7 to 9.3) and tripotassium phosphate ($K_3PO_4$; pH=11.5 to 12.5), and tetrapotassium pyrophosphate ($K_4P_2O_7$; pH=10.0 to 10.7). These phosphoric acid salts may be used alone or in the form of a mixture of two or more members.

Among the above-mentioned phosphoric acid salts, a phosphoric acid salt selected from the group consisting of disodium hydrogen-phosphate, trisodium phosphate, dipotassium hydrogen-phosphate and tripotassium phosphate is preferred. By using these phosphoric acid salts, sufficient deodorizing effect can be obtained, and a treated object can easily maintain the solid state or semi-solid state (gel state).

Particularly, in the case where sodium polyacrylate is used as the water absorptive polymer, disodium hydrogen-phosphate or trisodium phosphate, of which the counter ion is sodium ion, is preferred among the above-mentioned phosphoric acid salts. These phosphoric acid salts can suppress change of the molecular structure by exchanging calcium ion of slaked lime for sodium ion of sodium polyacrylate; therefore, the effect of maintaining a treated object in the solid or semisolid state (gel state) can be increased.

As a method of preparing the above-mentioned phosphoric acid salts, a method of purchasing a commercial product is preferred. For example, disodium hydrogen-phosphate can be purchased from Kishida Chemical Co., Ltd. or MITEJIMA CHEMICAL CO., LTD.

(Carbonic Acid Salt)

Examples of the carbonic acid salt at pH 8 to 13 that can be used in the invention include, more specifically, sodium hydrogen carbonate ($NaHCO_3$ (sodium bicarbonate); pH=8.5), potassium hydrogen carbonate ($KHCO_3$; pH=8 to 8.5), sodium carbonate ($Na_2CO_3$ or $Na_2CO_3.H_2O$; pH=11 to 12), and potassium carbonate ($K_2CO_3$ or $K_2CO_3.1.5H_2O$; pH=11.5 to 12.5). These carbonic acid salts may be used alone or in the form of a mixture of two or more members.

Among the above-mentioned carbonic acid salts, sodium hydrogen carbonate is preferred. By using sodium hydrogen carbonate, sufficient deodorizing effect can be obtained, and a treated object can easily maintain solid state or semi-solid state (gel state). In addition, an effect that the aggregated treatment agent can rapidly decay and coat a treating object when a treating object is contacted with the aggregated treatment agent is also provided. In addition, sodium hydrogen carbonate has a sodium ion as a counter ion of carbonic acid, and when sodium polyacrylate is used as the water absorptive polymer, the effect of maintaining a treated object to be the solid or semisolid state (gel state) can be increased by the similar mechanism of the above-mentioned phosphoric acid salt.

As a method of preparing the above-mentioned carbonic acid salts, a method of purchasing a commercial product is preferred. For example, sodium hydrogen carbonate can be purchased from OKURA AGRI FOODS CO., LTD., Takasugi Pharmaceutical Co., Ltd. and Showa Chemical Industry Co., Ltd.

(Hydroxide)

Examples of the hydroxide at pH 8 to 13 that can be used in the invention include, more specifically, magnesium hydroxide ($Mg(OH)_2$; pH=9.5 to 10.5) and barium hydroxide ($Ba(OH)_2$; pH=12.5 to 13). These hydroxides may be used alone or in the form of a mixture of two or more members.

Among the above-mentioned hydroxides, magnesium hydroxide is preferred from a viewpoint of availability and the like.

As a method of preparing the above-mentioned hydroxides, a method of purchasing a commercial product is preferred. For example, magnesium hydroxide can be purchased from JUNSEI CHEMICAL CO., LTD.

[Additive]

Another preferred embodiment of the aggregated treatment agent of the invention may contain an additive. The additive is preferably at least one of zeolite and zinc oxide. Furthermore, the aggregated treatment agent may comprise at least one member selected from the group consisting of activated carbon, a lubricant, hypochlorite and quaternary ammonium salt as an additive.

The amount of the additive is not particularly limited within a range allowing accomplishment of the intended effects of the invention, and is preferably about 0.5 to 30 weight %, more preferably about 0.7 to 20 weight %, and further preferably about 0.8 to 18 weight % with respect to the total mass of the aggregated treatment agent.

Hereinafter, constitution elements of the additive will be described in detail.

(Zeolite)

The aggregated treatment agent of the invention may further comprise zeolite as an additive. Zeolite can adsorb ammonia components contained in a treating object (for example, excrement), and thus it has a deodorization effect. By containing zeolite, pores of zeolite can capture malodor, and suppress malodor emission.

The zeolite of the invention may be natural or artificial. The zeolite is preferably artificial zeolite from a viewpoint of availability. In addition, the zeolite is preferably mordenite in which very minute cavities of about 5.5 to 8 Å (slightly greater than water or nitrogen molecule) are constituted in a tunnel shape.

In the case where a commercial product is purchased, zeolite 2460, zeolite 60 and zeolite CP manufactured by Shin Tohoku Chemical Industry Co., Ltd. are, for example, preferred.

The upper limit of the average particle diameter of the zeolite is not particularly limited. It is preferably about 0.5 mm and more preferably 0.4 mm, and the lower limit is about 10 μm.

Examples of the chemical composition of the zeolite include $SiO_2$ (silicon oxide), $Al_2O_2$ (aluminum oxide), CaO (calcium oxide), $Na_2O$ (sodium oxide), $K_2O$ (potassium oxide), $Fe_2O_3$ (iron oxide), MgO (magnesium oxide), stuck water ($H_2O$), bound water ($H_2O$), and the like, wherein each component is contained in about 70.5 weight %, about 11.3 weight %, about 2.6 weight %, about 1.6 weight %, about 1.3 weight %, about 0.7 weight %, about 0.1 weight %, about 8.0 weight % and about 3.9 weight %, respectively. Of course, the chemical composition of the zeolite is not limited to such composition. Those prepared to be 100 weight % in total wherein each component is in about 1% to 20% may be used. In the invention, for example, zeolite such as $K[AlSi_2O_6]$ may be used.

In the case where zeolite is used, the use amount thereof can be suitably adjusted depending on the member and the shape of zeolite, and components contained in a treating object (for example, excrement), and the like; and the use amount is preferably about 0.1 to 50 weight %, more preferably about 1 to 30 weight %, and further preferably about 2 to 20 weight % with respect to the total mass of the treatment agent. By such range, the effect of suppressing malodor is further provided, and it is also economical in terms of cost.

(Zinc Oxide)

The aggregated treatment agent of the invention may further comprise zinc oxide as an additive. Zinc oxide (ZnO) is an oxide of zinc; it can adsorb odor components such as ammonia and sulfide, and thus has a deodorization effect.

Zinc oxide can be freely selected from commercial products. Examples of the zinc oxide include zinc oxide I (manufactured by Hakusuitech Co., Ltd.), zinc oxide II (manufactured by Hakusuitech Co., Ltd.) and the like.

The content of zinc oxide in the invention is not particularly limited. It is preferably 0.01 to 30 weight %, more preferably 0.1 to 20 weight %, further preferably 0.2 to 15 weight %, still further preferably 0.3 to 12 weight %, and particularly preferably 0.5 to 10 weight % with respect to the total mass of the treatment agent (100 weight %).

The particle diameter of zinc oxide is not particularly limited, and zinc oxide meeting the quality of Type 1 or 2 of JIS standard (K-1410) is preferred.

(Activated Carbon)

The aggregated treatment agent of the invention may comprise activated carbon. Activated carbon is preferably added from a viewpoint of suppressing malodor released by slaked lime. In addition, activated carbon also has an effect of suppressing malodor generated during treatment of excrement.

The activated carbon used in the invention is not particularly limited. Specific examples of activated carbon include activated carbons obtained with a known method using a raw material such as charcoal, coke, coconut husk, natural fibers, polyacrylonitrile, rayon, synthetic resins such as a phenol resin, and pitch. These may be used alone, or may be used in combination of 2 or more members. In addition, the activated carbon may be synthesized, or a commercial product may be used. Examples of the commercial product include activated carbon GY for alkali, activated carbon GX for acid (manufactured by TOYOBO CO., LTD) and the like.

Furthermore, a commercial product in which slaked lime and activated carbon are previously mixed, for example, Sorbalit (registered trademark) may be used as the slaked lime component and the activated carbon component of the treatment agent. Sorbalit (manufactured by Ube Material Industries, Ltd.) is preferred from a viewpoint of adsorbing malodorous substances.

The shape of the activated carbon is not particularly limited, and examples thereof include a particle shape, a powder shape, a granulated shape, a pellet-like shape, a macaroni shape, a fiber-like shape, a honeycomb shape and the like.

The use amount of activated carbon in the case where activated carbon is used, can be suitably adjusted depending on the member and the shape of activated carbon, and components contained in a treating object (for example, excrement) and the like; and it is preferably about 0.1 to 20 weight %, more preferably about 0.4 to 15 weight %, and further preferably about 0.3 to 10 weight % with respect to the total mass of the treatment agent. By such range, the effect of suppressing malodor can be further increased, and it is also economical in terms of cost.

(Lubricant)

The aggregated treatment agent of the invention may comprise a lubricant. A lubricant is used particularly for smooth feed into a mortar of a tableting machine when the aggregated treatment agent is manufactured.

As the member of the lubricant, a conventionally known lubricant may be suitably selected, or may be used in combination. Examples of the lubricant include esters such as sucrose fatty acid ester, silicon such as disilicon oxide, calcium stearate, potassium stearate, zinc stearate and the like, and the lubricant is preferably esters, silicon, calcium stearate and zinc stearate.

The content of the lubricant is preferably about 0.5 to 20 weight %, and more preferably about 0.8 to 17 weight % with respect to the total mass of the aggregated treatment agent of the invention. By such range, raw materials can be smoothly fed, and decay property of the aggregated treatment agent can be increased when a treating object is treated.

(Hypochlorite)

The aggregated treatment agent of the invention may comprise hypochlorite. Hypochlorite is a salt of hypochlorous acid having the structure H—O—Cl in which a hydrogen atom and a chlorine atom are bonded to an oxygen atom. The member of hypochlorite is not particularly limited. The hypochlorite is preferably an inorganic salt, and it is more preferably selected from the group consisting of sodium hypochlorite (NaClO), potassium hypochlorite (KClO), and calcium hypochlorite (bleaching powder) (CaCl(ClO).H$_2$O or Ca(ClO)$_2$). In addition, the hypochlorite may be used alone or in a mixture of 2 or more members.

Hypochlorite has similar effects to those of slaked lime because hypochlorite is alkaline.

The shape of the hypochlorite is not particularly limited, and examples thereof include a granulated shape, a pellet-like shape and the like. The shape of the hypochlorite is preferably a granulated shape from a viewpoint that hypochlorite can be effectively dispersed to feces.

In addition, the lower limit of the average particle diameter thereof is not particularly limited. It is preferably, for example, 10 µm, and more preferably 50 µm. The upper limit of the average particle diameter is not particularly limited. It is, for example, 1000 µm, preferably 500 µm, more preferably 300 µm, and further preferably 150 µm. Namely, the average particle diameter is preferably 10 to 1000 µm, more preferably 50 to 300 µm, and further preferably 100 to 150 µm. By such range, manufacture of the treatment agent becomes easy, the production cost can be lowered, and the contact area of the obtained treatment agent with a treating object may increase and the reaction efficiency may improve, and in addition, aggregated matters of the treatment agent do not remain at the time of the treatment, namely unreacted matters do not remain. Two or more members of hypochlorite having different average particle diameters may be used in combination as necessary.

The content of the hypochlorite in the case where hypochlorite is contained in the aggregated treatment agent is preferably about 0.0000001 to 50 weight %, more preferably about 0.000001 to 20 weight %, and further preferably about 0.00001 to 10 mass % with respect to the total mass of the aggregated treatment agent. By such range, the effects of reducing malodor and suppressing generation of gas are further well obtained at the time of treatment of a treating object (for example, excrement).

As a method of preparing hypochlorite, a method of purchasing a commercial product is preferred. For example, in the case of calcium hypochlorite, High Test Hypochlorite 70 (NIPPON SODA CO., LTD.) is preferred.

(Quaternary Ammonium Salt)

The aggregated treatment agent of the invention may comprise a quaternary ammonium salt. The quaternary ammonium salt is preferably added from a viewpoint of sterilization and disinfection. The quaternary ammonium salt is not particularly limited if the above-mentioned effects can be provided. It is preferably selected from the group consisting of cetylpyridinium chloride, benzalkonium chloride, benzethonium chloride, decylisononyldimethyl ammonium salt and dioctyldimethyl ammonium chloride. The quaternary ammonium salt is more preferably cetylpyridinium chloride and benzalkonium chloride. In addition, the quaternary ammonium salt may be used alone or in a mixture of 2 or more kinds.

The content of the quaternary ammonium salt in the case where the quaternary ammonium salt may be contained in the aggregated treatment agent is preferably about 0.0000001 to 50 weight %, more preferably about 0.000001 to 20 weight %, and further preferably about 0.00001 to 10 mass with respect to the total mass of the aggregated treatment agent. By such range, further better sterilization and disinfection effects can be obtained at the time of treatment of a treating object (for example, excrement).

(Other Additives)

The treatment agent of the invention may further contain other additives unless they bring a bad influence to the invention. Examples of such additive include a flavoring agent, a deodorant and deodorization agent, a hydrophilic organic compound such as alcohol, and a surfactant from a viewpoint of countermeasure against malodor; a drying agent such as silica gel and anhydrous sodium sulfate from a viewpoint of controlling the moisture content in excrement; a chlorine-containing substance such as chlorine dioxide from a viewpoint of sterilization and deodorization; and a hydroxide of Group I element such as sodium hydroxide from a viewpoint of complementing alkaline condition in treatment of excrement. These additives may be used in alone or may be used in combination of 2 or more members.

Examples of the flavoring agent include lemon oil, lemon glass, cinnamon oil, lavender oil, Vetiver and the like.

As the surfactant, various surfactants may be used. Specific examples of the surfactant include a nonionic surfactant such as polyoxyethylene alkylether, polyoxyethylene alkylphenylether, polyoxyethylene monofatty acid ester, polyoxyethylene difatty acid ester, polyoxyethylene propylene glycol fatty acid ester, polyethylene sorbitan monofatty acid ester and glycerol monofatty acid ester; an anionic surfactant such as alkyl benzene sulfonic acid salt, alkyl sulfosuccinate, alkyl sulfate, polyoxyethylene alkyl sulfate and aryl sulfonate; a cationic surfactant such as long chain primary amine salt, dialkyldimethyl ammonium salt, alkyltrimethyl ammonium salt, benzyl trimethyl ammonium chloride, alkyl pyridinium salt, benzalkonium chloride and benzethonium chloride; and an amphoteric surfactant such as alkyldiaminoethyl glycine hydrochloride and alkylpolyaminoethyl glycine hydrochloride. In addition, a packaging bag composed of a water-soluble resin, a packaging bag composed of water-soluble paper or a packaging bag composed of water-disintegrable non-woven fabric described below, which can be used in adding the treatment agent to excrement, can be also contained as an additive in the treatment agent of the invention.

In the case where the above-mentioned other additives are contained, the content is preferably about 0.1 to 10 weight %, and more preferably about 1 to 3 weight % with respect to the total mass of the aggregated treatment agent of the invention.

[Method of Manufacturing Aggregated Treatment Agent of the Invention]

The aggregated treatment agent of the invention can be manufactured by mixing the composition described above, and compressing the mixture to have a desired size or weight. At this time, as the mixing method, each component may be mixed at a time, or each component may be mixed sequentially. In the case where the carboxyvinyl polymer is used as the binder, the "solidification" described below is unnecessary, and thus the aggregated treatment agent can be manufactured by adding the carboxyvinyl polymer, after which each component is flocculated to form an amorphous aggregate. Just with adding and mixing the carboxy polymer as the binder, it is possible to achieve an effect of preventing scattering of dust particles of slaked lime, omit the processing process (tableting process), and also increase the production performance, and lower the cost, and accomplish the intended effects of the invention.

Hereinafter, a method of solidifying the aggregated treatment agent will be described with preferable, several embodiments in division. The method is not limited to the methods described below.

[Desk-Top Manual Tableting Machine]

A method of solidifying each component of the aggregated treatment agent of the invention with a desk-top manual tableting machine (pestle and mortar, one for each of them) is as described below. First, each component to be solidified is put into a pestle with spoon by hand. At this time, it is not necessary to consider difficulty of feed. Then, the lever is pressed down manually (hydraulic) to apply pressure, and solidify each component whereby to manufacture the aggregated treatment agent. The desk-top manual tableting machine makes the components be pressed for a substantial time, and thus the machine has an advantage that it can solidify a combination of components that are hardly solidified. For example, in the case where a pestle having a small diameter (7 mm diameter: up-and-down disk type) is used, the pressure per area further increases by the small diameter, and thus there is a tendency that even components that are hardly solidified can be hardened. On the other hand, for example, in the case where a pestle having a large diameter (15 mm diameter: up-and-down plate type) is used, the pressure per area reduces by the large diameter, and thus the pestle is disadvantageous for components that are hardly solidified, but advantageous in feed into the pestle by the large diameter, and productivity can be improved.

[Continuous Tableting Machine]

As a continuous tableting machine, a direct type is preferably adopted from the point that some processes of the pre-treatment (for example, granulation process; a dry type is preferred because the water absorptive polymer is used in the invention) can be omitted and productivity can be improved, although other types than the direct type may be also used. However, main components of the invention contain slaked lime, and slaked lime has a small particle diameter, and thus a lubricant agent is preferably added to facilitate feed of such fine component. On the other hand, in the case where pre-treatment is performed, the aggregated treatment agent may be manufactured by, for example, applying great pressure using a roller compactor and performing rolling to granulate fine particles, and mixing a binder with the granulate, and tableting the granulate. For example, a tableting machine manufactured by HATA IRON WORKS CO., LTD. (Type AP18-SS-II) is preferably used in consideration of mass production. The pestle and the mortar of the tableting machine have about 13 mm diameter, and the pestle number is about 18. Such tableting machine can be preferably used because it is possible to perform production only by preparing raw materials in a desired ratio, mixing them, putting the mixed raw materials into the hopper of the tableting machine, and tableting the mixed raw materials by rotary type of the tableting machine.

In addition, the aggregated treatment agent may be manufactured with a continuous rotary type tableting machine. Specifically, each component (for example, slaked lime, the water absorptive polymer, the binder, the phosphoric acid salt, the lubricant) is mixed for preparing a mixture, and the mixture is put into the hopper of the continuous tableting machine, and tableting is performed. The shape of the pestle may be, for example, an up-and-down disk type.

As described above, a method of solidifying the aggregated treatment agent is not particularly limited. As described above, tableting, a roller compactor and wet type compression (compression with wetting a technical product of compression subject with water) may be suitably combined and applied. Meanwhile, because the aggregated treatment agent contains the water absorptive polymer, there is also a solidifying method that the mixture of slaked lime and additives such as a lubricant is granulated in wet type prior to mixing the water absorptive polymer, and then it is added for mixing. In addition, the aggregated treatment agent may be manufactured with a continuous rotary type tableting machine. Specifically, each component is mixed to prepare a mixture, and the mixture is put into the hopper of the continuous tableting machine and tableting is performed. The shape of the pestle may be, for example, an up-and-down disk type.

[Use of the Aggregated Treatment Agent of the Invention]

Use of the aggregated treatment agent of the invention is not particularly limited. For example, the aggregated treatment agent can be used for treatment of excrement, organic sludge, animals and plants, farm animals, livestock barn and soil. There are various effects that the aggregated treatment agent may be used as a treatment agent for excrement, a treatment agent for organic sludge, for animals and plants, for a farm animal, for livestock barn or for a treatment agent soil.

Specifically, in the case where the aggregated treatment agent of the invention is contained in the treatment agent for excrement, the aggregated treatment agent is solidified, and thus dust particles do not float when the treatment agent is used, and handling property can be improved.

In addition, in one embodiment of the aggregated treatment agent, the water absorptive polymer and the phosphoric acid salt are contained in the aggregated treatment agent, and thus a treated object can maintain the solid or semisolid form (gel state) over a long period of time immediately after treatment of a treating object. As a result thereof, handling property of the treated object can be further improved.

For treatment of excrement, the aggregated treatment agent can be used in a toilet for disaster, a toilet for traffic congestion (toilet that is used in a car at the time of traffic congestion), a temporary toilet at a construction site and the like, and a toilet for a pet (toilet of a cat or a dog). Furthermore, the aggregated treatment agent can be applied to treatment of excrement in a region (for example, overseas) or circumstances (at the time of disaster) without having a water-washing infrastructure. In the case where the aggregated treatment agent is used for treatment of excrement, such excrement includes not only human excrement, but also animal excrement such as cow excrement, pig excrement and chicken excrement. In addition, the excrement may be feces alone, urine alone, or a mixture of feces and urine. The aggregated treatment agent is suitably used for treatment of excrement, and particularly suitably used for treatment of feces. In the case of feces alone, feces preferably contain a large amount of moisture.

For treatment of organic sludge, the aggregated treatment agent can be suitably used for treatment of contaminated river, food residues discharged from restaurants, vomit of a patient with an infectious disease or the blood.

For treatment of animals and plants, a farm animal, livestock barn or soil, the aggregated treatment agent can be suitably applied; specifically in treatments of animals and farm animals suffering from an infectious disease such as foot-and-mouth disease and avian influenza, and feed and livestock barn or soil thereof. A powdery form of slaked lime is usually used in disinfection of foot-and-mouth disease virus or avian influenza virus, but the aggregated treatment agent is solidified, and thus can significantly reduce damages of dust particles from slaked lime by being contained in a treatment agent for animals and plants, a treatment agent for a farm animal, a treatment agent for livestock barn or a treatment agent for soil. Furthermore, the aggregated treatment agent improves handling property of a treatment agent, and does not impair reactivity to non-treatment matters, and can be also used as a disinfectant, a germicide, a sterilant or a deodorant. Then, slaked lime and the like used for disinfection are usually also present in a particle shape, but due to poor reactivity, they are generally used in a powdery form. The aggregated treatment agent are the form of particles obtained by mixing a water absorptive polymer (polymer water absorptive agent) and solidifying the mixture, and such polymer water absorptive agent plays a role as the base point for decay by being swollen when contacted with moisture. Accordingly, the aggregated treatment agent may not decrease reactivity (namely, having equal reactivity to that of the powdery form) despite the aggregated form (particle shape); it can improve handling property; it does not decrease reactivity by being crushed to the powdery form when applied; and it is very suitable for disinfection of foot-and-mouth disease virus or avian influenza virus. In addition, a treated object can be easily recovered.

<Second Aspect of the Invention>

The second aspect of the invention is a granulated treatment agent obtained by crushing the aggregated treatment agent (the first aspect of the invention). In the granulated treatment agent, the amount of the binder can be reduced because the solid state compared to the aggregated treatment agent may not be needed for a long time, and thus the ratio of the active components per unit weight can be increased in comparison to the aggregated treatment agent.

In addition, although the components of the treatment agent is once made as aggregated matters and crushed as granules, the effect of increasing the water absorptive property can be continuously provided, and thus the granulated treatment agent is also suitable. The granulated treatment agent of the invention is obtained by crushing the aggregated treatment agent that has been once solidified. In a conventional powdery treatment agent, it has not been known that a treatment agent is manufactured via a process for once solidifying components. Namely, the granulated treatment agent is different from conventional powdery treatment agents in terms of the constitution (presence or absence of the binder).

A method for crushing the aggregated treatment agent is not particularly limited. Examples thereof include conventional known pulverization devices and the like. The usable pulverization device may be classified into a shear crusher, an impact crusher and a high performance rotary crusher, and the crusher preferably has at least one mechanism selected from cutting, shear, impact and friction. For example, a sizing machine manufactured by HATA IRON WORKS CO., LTD., a table mill manufactured by OKADA SEIKO CO., LTD. and the like may be used. Other devices besides them may be used. For example, the aggregated treatment agent may be crushed with a hammer and the like.

In addition, the granulated treatment agent of can be manufactured by stirring. When the aggregated treatment agent is compressed, the granulated treatment agent can be manufactured by stirring the aggregated treatment agent having hardness such that the aggregated treatment agent may be crushed by stirring with a stirring machine. With such method, generation of dust particles is suppressed when the granulated agent is manufactured.

The average particle diameter of the granulated treatment agent is preferably more than 150 µm and less than 3 mm, more preferably about 0.05 to 2 mm, and further preferably about 0.1 to 1 mm per one particle. By such range, it is possible to improve handling property, and increase the contact area with a treating object, and improve the efficiency of the reaction with a treating object.

In the granulated treatment agent, the amount of the binder can be reduced in comparison with the aggregated treatment agent. As the standard of amount, the binder is preferably reduced by 10%, more preferably reduced by 30%, and further preferably reduced by 50% to 70% in comparison to the amount of the binder in the aggregated treatment agent. The amounts of slaked lime, the binder, the salt selected from a phosphoric acid salt, a carbonic acid salt and a hydroxide, or the additive and the like may be increased as the binder is decreased in order to be 100 weight % of the total amount.

<Third Aspect of the Invention>

The third aspect of the invention is a toilet in which the aggregated treatment agent or the granulated treatment agent is arranged in advance. The toilet of the invention comprises at least one of the aggregated treatment agent and the granulated treatment agent, and thus the toilet has the same effects as the aggregated treatment agent and the granulated treatment agent. The toilet of the invention comprising the aggregated treatment agent is very preferred from a viewpoint of handling property. The toilet of the invention comprising the granulated treatment agent of the invention is preferred from a viewpoint that the surface area of the treatment agent can be increased and reactivity can be improved.

In the case where the aggregated treatment agent or the granulated treatment agent is used for treatment of excrement, the use amount of the aggregated treatment agent is preferably 10 to 200 mass parts, more preferably 20 to 100 mass parts, and further preferably 30 to 60 mass parts with respect to 100 mass parts of an object (for example, excrement). In the case where the use amount of the treatment agent is less than 10 mass parts, the contact area between excrement and slaked lime may be decreased; therefore, the excrement can be contacted with air, and fermentation and decomposition of the excrement may likely proceed. On the other hand, in the case where the use amount of the treatment agent is more than 100 mass parts, the residue of the treatment agent may increase, and waste after the treatment may increase. The cost may also be increased. In addition, the same effects can be provided when the use amount of the granulated treatment agent is reduced by about 5% in comparison to that of the aggregated treatment agent.

Accordingly, when the aggregated treatment agent or the granulated treatment agent is arranged in advance in the toilet of the invention, the amount in the range described above is preferably arranged.

The toilet of the invention has, for example, a portion for receiving excrement where the aggregated treatment agent or the granulated treatment agent is preferably arranged on a sheet of which the surface is water-repelling treated, or in a bag of which the interior is water-repelling treated, from a viewpoint of easiness in handling. Excrement is added in the portion of the toilet so as to discard them very easily.

The odor of excrement can be generally divided into the odor of feces and the odor of ammonia. The odor of feces is an odor caused by organic matters, and the odor of ammonia is an odor caused by inorganic matters. The odor of ammonia is hardly diffused after excretion by tying the bag of which the surface is water-repelling treated. However, in the odor of feces, gas is generated from a sample itself, and thus the internal pressure in a bag (for example, a plastic bag) of which the surface is water-repelling treated may be heightened, and the odor of feces tends to be leaked out and diffused although the plastic bag is tied. With a conventional known treatment agent for excrement, the deodorization effect is low, and thus it is difficult to suppress the odor of excrement (particularly, the odor of feces). The invention provides the aggregated treatment agent, the granulated treatment agent, and the toilet, and it is possible to treat excrement simply and effectively without need to perform procedures such as stirring; and also generation of malodor and gas can be suppressed because of effects such as sterilization. For example, the invention can remarkably improve toilet condition in afflicted areas and it is particularly suitable in sanitation.

As described above, the aggregated treatment agent is solidified, and thus can be applied in advance in a portable toilet and the like, and urination or evacuation can be performed on the aggregated treatment agent. With the aggregated treatment agent, dust particles such as slaked lime cannot be floated by the force of urination or evacuation. Namely, slaked lime contained in the treatment agent, which is strongly alkaline having corrosive property, may not float, and thus cannot be scattered to the delicate part of the human body, and the aggregated treatment agent is preferable in terms of the health.

In addition, as described above, the aggregated treatment agent or the granulated treatment agent can make a treating object solid or semisolid state (gel state) even if the object is liquid; furthermore, the solid or semisolid (gel) form can be kept for a long period of time. Consequently, even under circumstances such that a treated object cannot be transferred to a disposal site, and has to be kept for a long period of time, the treated object may not be liquefied and leaked out, and thus the aggregated treatment agent or the granulated treatment agent is preferable in sanitation. As a phenomenon where a treated matter becomes liquid may be remarkable under high temperature, the aggregated treatment agent or the granulated treatment agent exhibits excellent effects particularly in the summer season or in a region of high atmospheric temperature.

In addition, a preferable embodiment of the toilet of the invention is a toilet in which the aggregated treatment agent or the granulated treatment agent is arranged in advance in the absence of water. Namely, the toilet has a dry form without need of water, and preserving property as a toilet improves. In addition, the toilet does not have a problem such as dust particles, and as a portable toilet, urination and evacuation can be performed over the toilet Moreover, in the toilet of the invention where the treatment agent is previously arranged, users do not need to check excrement of oneself (or those dependent on care and the like) after excretion, and thus they can use the toilet comfortably. In contrast, with a conventional treatment agent, users need to sprinkle the treatment agent over excrement by oneself (or a care giver and the like) after excretion, which may be unpleasant to them (or a care giver and the like). However, in the toilet of the invention, the treatment agent is previously arranged, and thus the toilet also has an effect that to check excrement may not be particularly needed and, as necessary, the used toilet can be discarded as such.

<Fourth Aspect of the Invention>

The fourth aspect of the invention is an absorption article, which is formed by comprising the aggregated treatment agent or the granulated treatment agent of the invention. The absorption article is preferably provided with the aggregated treatment agent or the granulated treatment agent, a liquid-permeable surface sheet, and a non-liquid-permeable back sheet.

A method for manufacturing the absorption article is not particularly limited. The absorption article may be manufactured, for example, by interposing the aggregated treatment agent or the granulated treatment agent between a liquid-permeable substrate (surface sheet) and a non-liquid-permeable substrate (back sheet), and providing an elastic member, a diffusion layer, an adhesive tape and the like as necessary, whereby to provide an absorption article, for example, a paper diaper for adult and a sanitary napkin.

The aggregated treatment agent or the granulated treatment agent can impart deodorizing function to the absorption article, and thus the absorption article can exhibit excellent deodorizing performance and absorption property over a long time.

Examples of such absorption article include, specifically, a paper diaper for adult, of which the market remarkably grows in recent years, a diaper for children, a sanitary napkin, a sanitary material such as so-called incontinence pad, and the like, but are not particularly limited thereto. The aggregated treatment agent or the granulated treatment agent included in the absorption article has very excellent deodorizing property; furthermore, liquid is hardly leaked out of the absorption article for a long time after treating a treating object having high fluidity such as urine, and the burden of a person himself who wears the absorption article or a care giver for the person can be significantly reduced.

The amount of the aggregated treatment agent or the granulated treatment agent contained in the absorption article can be suitably adjusted depending on the use, but is preferably about 5 to 50 g, and more preferably about 10 to 30 g in the absorption article in the case of a sanitary material and the like.

EXAMPLES

Hereinafter, the invention will be further described in details with Examples, but the invention is not limited to Examples described below.

[Manufacture of the Aggregated Treatment Agent]

Example 1

The components shown in Table 1 described below were mixed in the mixing ratio shown in Table 1 described below (total 100 weight %) to become 2,000 g whereby to manufacture a mixture. 2,000 g of such mixture was tableted at 1.5 kN of the base pressure and 30 rpm using a φ13 mm pestle and a mortar with a continuous tableting machine, HT-AP18SS-II manufactured by HATA IRON WORKS CO., LTD. whereby to manufacture 2000 particles of the aggregated treatment agent (0.8 g per 1 particle, average diameter: 13 mm, average thickness: 6 mm).

The raw materials used in Table 1 were as follows. As the water absorptive agent (1), AQUA KEEP SA-50II (sodium polyacrylate-based water absorptive polymer) manufactured by Sumitomo Seika Chemicals Company Limited was used; as the binder, KC Flock (W-200/200G) manufactured by NIPPON PAPER Chemicals CO., LTD. was used; as the disodium hydrogen-phosphate, disodium hydrogen-phosphate (pH=9.0 to 9.6) manufactured by MITEJIMA CHEMICAL CO., LTD. was used; and as the lubricant (calcium stearate), product name SAK-CS-P manufactured by SUN ACE CORPORATION was used.

The particle size distribution of AQUA KEEP SA-50II manufactured by Sumitomo Seika Chemicals Company Limited used as the water absorptive agent was as described below.

850 μm on 0.0

500 μm on 0.0

180 μm on 87.4

106 μm on 9.8

106 μm pass 2.8            [Chemical Formula 1]

The average particle diameter of KC Flock (W-200/200G) manufactured by NIPPON PAPER Chemicals CO., LTD. used as the binder was 32 μm.

Example 2

The aggregated treatment agent was manufactured similarly to Example 1 except that zeolite was added, and further the mixing ratio was changed as shown in Table 1 described below. As the zeolite, zeolite CP manufactured by Shin Tohoku Chemical Industry Co., Ltd. was used. The average particle diameter of the zeolite was 0.2 mm or less.

Examples 3 to 9

The aggregated treatment agents were manufactured similarly to Example 1 except that the mixing ratios were changed as shown in Table 1 described below for the components shown in Table 1 described below.

Examples 10 to 12

The aggregated treatment agents were manufactured similarly to Example 1 except that the water absorptive agent (2) was used instead of the water absorptive agent (1), and the mixing ratios were changed as shown in Table 1 described below for the components shown in Table 1 described below.

As the water absorptive agent (2), AQUA KEEP SA-60N TYPE-II manufactured by Sumitomo Seika Chemicals Company Limited was used. The average particle diameter of the water absorptive agent (2) was 300 μm.

Example 13

The aggregated treatment agent was manufactured similarly to Example 1 except that sodium bicarbonate (sodium hydrogen carbonate; pH=8.5) was used instead of disodium hydrogen-phosphate, and the mixing ratio was changed as shown in Table 1 described below for the components shown in Table 1 described below.

As the sodium bicarbonate, sodium hydrogen carbonate manufactured by OKURA AGRI CO., LTD. was used.

TABLE 1

|  | Example 1 | Example 2 | Example 3 | Example 4 | Example 5 | Example 6 | Example 7 | Example 8 | Example 9 | Example 10 | Example 11 | Example 12 | Example 13 |
|---|---|---|---|---|---|---|---|---|---|---|---|---|---|
| Slaked lime | 16% | 16% | 14% | 13% | 11% | 12% | 10% | 11% | 10% | 10% | 12% | 12% | 12% |
| Water absorptive agent (1) | 36% | 34% | 35% | 35% | 39% | 35% | 35% | 35% | 35% | — | — | — | — |
| Water absorptive agent (2) | — | — | — | — | — | — | — | — | — | 35% | 36% | 35% | 35% |
| Binder | 31% | 31% | 36% | 36% | 36% | 36% | 36% | 36% | 36% | 38% | 37% | 38% | 38% |
| Disodium hydrogen-phosphate | 16% | 16% | 14% | 13% | 11% | 14% | 16% | 17% | 18% | 16% | 14% | 14% | — |
| Sodium bicarbonate | — | — | — | — | — | — | — | — | — | — | — | — | 14% |
| Zeolite | — | 2% | — | 2% | 2% | 2% | 2% | — | — | — | — | — | — |
| Lubricant | 1% | 1% | 1% | 1% | 1% | 1% | 1% | 1% | 1% | 1% | 1% | 1% | 1% |
| Total | 100% | 100% | 100% | 100% | 100% | 100% | 100% | 100% | 100% | 100% | 100% | 100% | 100% |

Examples 14 to 19

The aggregated treatment agents were manufactured similarly to Example 1 except that the mixing ratio was changed to the composition shown in Table 1-1 described below.

As the zinc oxide, zinc oxide (particle diameter: 2 to 3 μm), model number: zinc oxide Type I manufactured by Hakusuitech Co., Ltd. was used.

Examples 20 to 21

The composition was changed as shown in Table 1-1 described below. At first, a beaker was charged with zeolite, and then charged with a carboxyvinyl polymer (Carbomer) as the binder and stirring was performed with a mixer for kitchen. Then, the beaker was charged with slaked lime and stirring was performed with a mixer for kitchen. By charging in such sequence, zeolite plays a role of suppressing excessive viscosity of Carbomer, whereby to suppress Carbomer from adhering to the wall surface of the beaker. Then, by the action of the viscosity of Carbomer, it is possible to suppress dust particles of slaked lime from floating. Next, the beaker was charged with the other components in arbitrary sequence, and stirring was performed with a mixer for kitchen to make each component uniform, whereby to obtain an aggregated treatment agent in which the components are flocculated with each other so as to form an amorphous aggregate.

As the carboxyvinyl polymer (Carbomer), model number: AQUPEC HV-505 manufactured by Sumitomo Seika Chemicals Company Limited was used.

TABLE 2

[Test 1: Experiment for moisture solidification]

|  | Comparative Example 1 | Comparative Example 2 | Comparative Example 3 | Comparative Example 4 | Comparative Example 5 |
|---|---|---|---|---|---|
| Slaked lime | 26% | 28% | 26% | 26% | 20% |
| Water absorptive agent (1) | 28% | 28% | 30% | 30% | 28% |
| Binder | 35% | 33% | 33% | 33% | 37% |
| Disodium hydrogen-phosphate | 10% | 10% | 10% | 10% | 14% |
| Zeolite | 0% | 0% | 0% | 0% | 0% |
| Lubricant | 1% | 1% | 1% | 1% | 1% |
| Total | 100% | 100% | 100% | 100% | 100% |

To 10 g of the aggregated treatment agent of each of Examples and Comparative Examples as manufactured described above, 100 g water was added, and the mixture was kept at a temperature of 30° C. and relative humidity of 55%. Then, the period of time during which the treated object could maintain the solid or semisolid state (gel state) was evaluated. The evaluation was performed at 1 day, 3 days, 1 week and 1 month, respectively after water was added to the aggregated treatment agent, and the evaluation was performed in 4 grades by visual observation. The evaluation results are shown in Tables 3 and 3-1 described below. The details of the evaluation results are as described below. "-" in Tables 3 and 3-1 represents that measurement was not performed.

(Level of Solidification)

"⊙": Holding solid or semisolid state (gel state) equally to that at immediately after treatment "○": Holding somewhat weakened solid or semisolid state (gel state)

"Δ": Partial liquefaction observed

"x": Completely liquefied.

TABLE 1-1

|  | Example 14 | Example 15 | Example 16 | Example 17 | Example 18 | Example 19 | Example 20 | Example 21 |
|---|---|---|---|---|---|---|---|---|
| Slaked lime | 12 | 12 | 12 | 12 | 12 | 12 | 18.5 | 18.5 |
| Water absorptive agent (2) AQUA KEEP SA-60N TYPE-II | 35 | 35 | 35 | 35 | 35 | 35.5 | 53.5 | 55.5 |
| Binder KC Flock | 38 | 38 | 38 | 38 | 38 | 38 | — | — |
| Binder Carbomer | — | — | — | — | — | — | 3 | 0.5 |
| Disodium hydrogen-phosphate | 7 | 4 | 3 | 5.5 | 3 | 3 | 5.5 | 6.0 |
| Sodium bicarbonate | 7 | 10 | 9 | 5.5 | 8 | 8 | 13 | 13 |
| Zeolite | — | — | 2 | 2 | 2 | 2 | 6.0 | 6.0 |
| Zinc oxide | — | — | — | 1 | 1 | 0.5 | 0.5 | 0.5 |
| Lubricant | 1 | 1 | 1 | 1 | 1 | 1 | — | — |
| Total | 100% | 100% | 100% | 100% | 100% | 100% | 100% | 100% |

Comparative Examples 1 to 5

The aggregated treatment agent was manufactured similarly to Example 1 except that the phosphoric acid salt contained in the aggregated treatment agent was changed to sodium dihydrogen-phosphate (pH=4.3 to 4.9). As the sodium dihydrogen-phosphate, sodium dihydrogen-phosphate manufactured by MITEJIMA CHEMICAL CO., LTD. was used.

In Tables 3 and 3-1, the aggregated treatment agent of the invention could maintain the solid or semisolid state (gel state) equally to that at immediately after treatment even when 1 week elapsed, and liquefaction was nearly not observed. Contrary to this, in Comparative Examples containing sodium dihydrogen-phosphate as the phosphoric acid salt, softening started after 3 days, and partial liquefaction was observed when 1 week elapsed. Consequently, it was shown that the aggregated treatment agent had long period of time in maintaining the solid or semisolid state (gel state). On the other hand, the results of Examples 1 to 6 at 1 month were "Δ", and the results of Examples 7 to 13 were "○". However, it goes without saying that Examples 1 to 6 do not have a problem practically because the results at 1 week were "⊙" or "○". In addition, Examples 14 to 19 were also equal to or better than Examples 7 to 13, and the solidification level at 1 month was also good. In addition, it is understood that the results of Examples 20 to 21, in which Carbomer was used as the binder, were "○" even at 1 month, and the solidification level of the treated object was very good.

In addition, initial appearance of each treatment agent to which water was added, was observed although it was not shown in Table. As a result, there was a tendency that in the treatment agent containing zeolite (Examples 2 and 4 to 7), decay of the treatment agent easily occurred. In addition, a tendency was observed that as much as the addition amount of disodium hydrogen-phosphate was great, strong solid or semisolid state (gel state) can be maintained although initial water-absorption speed was somewhat decreased.

[Test 2: Experiment for Evaluation of Odor]

In a toilet pack of a vessel type (a plastic bag) of which the interior receiving excrement has water-repelling property, 50 g of the aggregated treatment agent of each of Examples and Comparative Examples manufactured as described above was arranged. Onto the arranged treatment agent, 200 g feces (feces of sex: male and age: 40) were added. The evaluation was performed at 1 day, 2 days, 3 days, 4 days, 5 days and 1 week, respectively after feces were added to the treatment agent, and was evaluated in 3 grades by sensory evaluation. The evaluation results are shown in Tables 3 and 3-1 described below. The details of the evaluation results are as described below.

(Level of Odor)
"⊙": Nearly no odor and deodorized
"○": Mild odor, but deodorized
"x": Strong malodor and no deodorizing effect.

In Tables 3 and 3-1, it was shown that the aggregated treatment agent of the invention has excellent deodorizing effect even when 1 week elapsed. In addition, it was shown that the results of Examples 14 to 16 and Examples 18 to 21 were "⊙" for all, and the aggregated treatment agent had significantly excellent deodorizing effect. Contrary to this, although Comparative Example 1 had good deodorizing effect, Comparative Example 5 nearly did not have deodorizing effect.

[Test 3: Experiment for Evaluation of Decay Property]

To 10 g of the aggregated treatment agent of each of Examples and Comparative Examples manufactured as described above, 100 g water was added, and the decay speed of the aggregated treatment agent was evaluated. The evaluation means that a treating object is rapidly coated by the treatment agent as much as the decay speed is fast, and diffusion of odor can be prevented. The evaluation was performed in 4 grades by sensory evaluation immediately after water was added to the treatment agent. The evaluation results are shown in Tables 3 and 3-1 described below. The details of the evaluation results are as described below.

(Level of Decay Property)
"⊙": Decay speed is very fast, and the aggregated treatment agent is decayed in 10 seconds or less after adding water to the treatment agent
"○": Decay speed is fast, and the aggregated treatment agent is decayed in less than 30 seconds after adding water to the treatment agent
"Δ": Decay speed is slightly slow, and 30 seconds or more is required for the aggregated treatment agent to decay after adding water to the treatment agent
"x": Decay speed is very slow, and 1 minute or more is required for the aggregated treatment agent to decay after adding water to the treatment agent.

In Tables 3 and 3-1, it was shown that the aggregated treatment agent of the invention has an effect of maintaining the solid or semisolid state (gel state), and most of the treatment agents have decay property for practical use. In addition, from comparison of Examples 7 to 9, it was suggested that if the content of disodium hydrogen-phosphate is equal to or less than a certain value, both of the performance of maintaining the solid or semisolid state (gel state) and the decay property can be secured.

TABLE 3

| | Test 1 | | | | Test 2 | | | | | | Test 3 |
|---|---|---|---|---|---|---|---|---|---|---|---|
| | Day 1 | Day 3 | One week | One month | Day 1 | Day 2 | Day 3 | Day 4 | Day 5 | One week | Test 3 |
| Example 1 | ⊙ | ⊙ | ⊙ | Δ | ⊙ | ⊙ | ⊙ | ○ | ○ | ○ | ⊙ |
| Example 2 | ⊙ | ⊙ | ⊙ | Δ | — | — | — | — | — | — | ⊙ |
| Example 3 | ⊙ | ⊙ | ⊙ | Δ | ⊙ | ⊙ | ⊙ | ⊙ | ⊙ | ⊙ | ⊙ |
| Example 4 | ⊙ | ⊙ | ⊙ | Δ | ⊙ | ⊙ | ⊙ | ⊙ | ⊙ | ⊙ | ⊙ |
| Example 5 | ⊙ | ⊙ | ○ | Δ | ○ | ○ | — | — | — | — | ⊙ |
| Example 6 | ⊙ | ⊙ | ○ | Δ | ○ | ○ | — | — | — | — | ⊙ |
| Example 7 | ⊙ | ⊙ | ⊙ | ○ | ⊙ | ⊙ | ⊙ | ⊙ | ⊙ | — | ○ |
| Example 8 | ⊙ | ⊙ | ⊙ | ○ | — | — | — | — | — | — | Δ |
| Example 9 | ⊙ | ⊙ | ⊙ | ○ | ⊙ | — | — | — | — | — | X |
| Example 10 | ⊙ | ⊙ | ⊙ | ○ | — | — | — | — | — | — | ⊙ |
| Example 11 | ⊙ | ⊙ | ⊙ | ○ | ⊙ | ⊙ | | | | | ○ |
| Example 12 | ⊙ | ⊙ | ⊙ | ○ | — | — | — | — | — | — | ○ |
| Example 13 | ⊙ | ⊙ | ⊙ | ○ | ⊙ | ⊙ | ⊙ | ⊙ | ⊙ | ⊙ | ⊙ |
| Comparative Example 1 | ⊙ | ○ | Δ | X | ⊙ | ⊙ | ⊙ | ○ | ○ | ○ | ⊙ |
| Comparative Example 2 | ⊙ | ○ | Δ | X | — | — | — | — | — | — | ⊙ |
| Comparative Example 3 | ⊙ | ○ | Δ | X | — | — | — | — | — | — | ⊙ |
| Comparative Example 4(*1) | ⊙ | ○ | Δ | X | — | — | — | — | — | — | ⊙ |

TABLE 3-continued

| | Test 1 | | | | Test 2 | | | | | | Test 3 |
|---|---|---|---|---|---|---|---|---|---|---|---|
| | Day 1 | Day 3 | One week | One month | Day 1 | Day 2 | Day 3 | Day 4 | Day 5 | One week | |
| Comparative Example 5 | — | — | — | — | X | X | — | — | — | — | ◉ |

*1: In Test 1, 0.5 g zeolite was further added to 10 g aggregated treatment agent, and evaluation was performed.

TABLE 3-1

| | Test 1 | | | | Test 2 | | | | | | Test 3 |
|---|---|---|---|---|---|---|---|---|---|---|---|
| | Day 1 | Day 3 | One week | One month | Day 1 | Day 2 | Day 3 | Day 4 | Day 5 | One week | |
| Example 14 | ◉ | ◉ | ○ | ○ | ◉ | ◉ | ◉ | ◉ | ◉ | ◉ | ◉ |
| Example 15 | ◉ | ◉ | ◉ | ○ | ◉ | ◉ | ◉ | ◉ | ◉ | ◉ | ◉ |
| Example 16 | ◉ | ◉ | ◉ | ○ | ◉ | ◉ | ◉ | ◉ | ◉ | ◉ | ◉ |
| Example 17 | ◉ | ◉ | ◉ | ○ | — | — | — | — | — | — | ◉ |
| Example 18 | ◉ | ◉ | ◉ | ○ | ◉ | ◉ | ◉ | ◉ | ◉ | ◉ | ◉ |
| Example 19 | ◉ | ◉ | ◉ | ◉ | ◉ | ◉ | ◉ | ◉ | ◉ | ◉ | ◉ |
| Example 20 | ◉ | ◉ | ◉ | ◉ | ◉ | ◉ | ◉ | ◉ | ◉ | ◉ | ◉ |
| Example 21 | ◉ | ◉ | ◉ | ◉ | ◉ | ◉ | ◉ | ◉ | ◉ | ◉ | ◉ |

In Tests 1 and 2 mentioned above, it was shown that the treatment agent of the invention exhibits an excellent deodorizing effect, and can maintain the solid or semisolid state (gel state) for a long period of time. Consequently, it was shown that an excellent deodorizing effect can be provided when the treatment agent was used for excrement, and handling property of a treated object after the treatment was also good. Furthermore, in Test 3 mentioned above, it was shown that most of the treatment agents of the invention also have good decay property when contacted with a treating object. Consequently, it was shown that the treatment agent has good treatment speed of a treating object; it can maintain the solid or semisolid state (gel state) over a long period of time; and it exhibits an excellent deodorizing effect when excrement is treated.

The invention claimed is:

1. An aggregated treatment agent comprising
   slaked lime,
   a water absorptive polymer,
   a binder, and
   at least one member selected from the group consisting of a phosphoric acid salt, a carbonic acid salt and a hydroxide at pH 8 to 13, and
   at least one member selected from the group consisting of sucrose fatty acid ester, disilicon oxide, calcium stearate, potassium stearate, and zinc stearate.

2. The aggregated treatment agent according to claim 1, wherein the phosphoric acid salt is selected from the group consisting of disodium hydrogen phosphate, trisodium phosphate, dipotassium hydrogen phosphate and tripotassium phosphate.

3. The aggregated treatment agent according to claim 1, wherein the aggregated treatment agent further comprises at least one of zeolite and zinc oxide.

4. The aggregated treatment agent according to claim 1, wherein the aggregated treatment agent is used for treatment of excrement.

5. The aggregated treatment agent according to claim 1, wherein an average diameter of the aggregated treatment agent is 7 to 100 mm.

6. A granulated treatment agent obtained by crushing the aggregated treatment agent according to claim 1.

7. The granulated treatment agent according to claim 6, wherein an average particle diameter of the granulated treatment agent is more than 150 mm and less than 7 mm.

8. A toilet including the aggregated treatment agent according to claim 1, where the aggregated treatment agent is arranged in advance.

9. A toilet including the granulated treatment agent according to claim 6, where the granulated treatment agent is arranged in advance.

10. The toilet according to claim 8, wherein the aggregated treatment agent is arranged in advance in the absence of water.

11. The toilet according to claim 9, wherein the granulated treatment agent is arranged in advance in the absence of water.

12. An absorption article for excrement comprising the aggregated treatment agent according to claim 1.

13. An absorption article for excrement comprising the granulated treatment agent according to claim 6.

14. A method of manufacturing the aggregated treatment agent according to claim 1, comprising mixing slaked line, water absorptive polymer, a binder, at least one member selected from the group consisting of a phosphoric acid salt, a carbonic acid salt, and a hydroxide at pH 8 to 13, and at least one member selected from the group consisting of sucrose fatty acid ester, disilicon oxide, calcium stearate, potassium stearate, and zinc stearate; and compressing the resulting mixture to obtain a desired size or weight by a tableting machine.

* * * * *